US010880976B2

United States Patent
Stutz et al.

(10) Patent No.: US 10,880,976 B2
(45) Date of Patent: Dec. 29, 2020

(54) LIGHTING DEVICE WITH COMMUNICATION OF OPERATING DATA

(71) Applicant: OSRAM GMBH, Munich (DE)

(72) Inventors: Michel Stutz, Munich (DE); Henry Feil, Unterhaching (DE); Christoph Peitz, Lippstadt (DE)

(73) Assignee: Osram GmbH, Munich (DE)

( * ) Notice: Subject to any disclaimer, the term of this patent is extended or adjusted under 35 U.S.C. 154(b) by 202 days.

(21) Appl. No.: 16/071,632

(22) PCT Filed: Apr. 6, 2017

(86) PCT No.: PCT/EP2017/058200
§ 371 (c)(1),
(2) Date: Jul. 20, 2018

(87) PCT Pub. No.: WO2017/182281
PCT Pub. Date: Oct. 26, 2017

(65) Prior Publication Data
US 2020/0275545 A1    Aug. 27, 2020

(30) Foreign Application Priority Data
Apr. 18, 2016  (DE) .................. 10 2016 107 154

(51) Int. Cl.
*H05B 47/19*    (2020.01)
*H04B 10/116*   (2013.01)
*H05B 47/175*   (2020.01)

(52) U.S. Cl.
CPC .......... *H05B 47/19* (2020.01); *H04B 10/116* (2013.01)

(58) Field of Classification Search
None
See application file for complete search history.

(56) References Cited

U.S. PATENT DOCUMENTS

| 2006/0241816 | A1  | 10/2006 | Draaijer |
|---|---|---|---|
| 2012/0074842 | A1  | 3/2012  | Hattori et al. |
| 2013/0234607 | A1  | 9/2013  | Kim et al. |
| 2014/0340190 | A1* | 11/2014 | Setomoto ............... H05B 47/19 340/3.1 |
| 2015/0076993 | A1* | 3/2015  | Mohan ................... H05B 47/19 315/153 |
| 2015/0163887 | A1  | 6/2015  | Kusakari |
| 2015/0237706 | A1  | 8/2015  | Ben-Moshe et al. |
| 2018/0375537 | A1* | 12/2018 | Peitz ....................... F21V 33/00 |

OTHER PUBLICATIONS

PCT; PCT App No. PCT/EP2017/058200; International Search Report and Written Opinion dated Jun. 22, 2017.

* cited by examiner

*Primary Examiner* — Dedei K Hammond
(74) *Attorney, Agent, or Firm* — Viering, Jentschura & Partner MBB

(57) ABSTRACT

A lighting device and a lighting system, respectively, are to be able to be more comfortably monitored. Thereto, a lighting device with an illuminant, a transmitting device arranged in or at the illuminant for wirelessly transmitting a locating signal to a terminal external with respect to the lighting device is proposed. Moreover, the lighting device comprises a data processing device arranged in or at the illuminant for extracting illuminant data about the illuminant and for providing this data for the transmitting device. The transmitting device is formed to also transmit the illuminant data to the external terminal besides the locating signal.

11 Claims, 2 Drawing Sheets

LIGHTING DEVICE WITH COMMUNICATION OF OPERATING DATA

CROSS-REFERENCE TO RELATED APPLICATIONS

This application is a U.S. national phase application filed under 35 U.S.C. § 371 of International Application Number PCT/EP2017/058200, filed Apr. 6, 2017, designating the United States, which claims benefit of German Patent Application No. 10 2016 107 154.4, filed on Apr. 18, 2016.

FIELD

The present invention relates to a lighting device with an illuminant, a transmitting device arranged in or at the illuminant, for wirelessly transmitting a locating signal to a terminal external with respect to the lighting device. Moreover, the present invention relates to a method for operating a lighting device with an illuminant, a transmitting device arranged in or at the illuminant, by wirelessly transmitting a locating signal from the transmitting device to a terminal external with respect to the lighting device.

BACKGROUND

The so-called "beacon technology" is based on a transmitter-receiver system. A "beacon" (in German: "Leuchtfeuer" or also "Bake" or "Peilsender") is a small, mostly battery-operated transmitter emitting a signal in (definable) time intervals mostly on the Bluetooth low energy standard. The radio signal of each beacon is characterized by a unique identification number (so-called UUID). Beacons can be used to impart a digital identification to objects and sites. Objects (at which a beacon is installed) and sites (at which a beacon is installed e.g. at a wall) can be identified by terminals (e.g. smart devices) in the signal field of the beacon in this manner.

Beacons can be used for identification of a site or for locating. By placing one or more beacons in a building area, thus, a type of radio-based raster arises, in which a smart device can locate itself via the BLE (Bluetooth low energy) interface as well as corresponding algorithms. Therein, the individual identification numbers of the installed beacons give an identifier to a site, by which a smart device can approximately determine the position (basic transmitting area of the beacon can be determined). Algorithms on the smart device can improve the position accuracy e.g. via signal strengths. Therein, it is required that the smart device can access information in a data storage (e.g. on a Cloud server) (e.g. identification number and mapping). If a terminal (for example smart device) gets into the range of a transmitter, it can detect the identification number and for example determine the site via server query. Therein, the locating algorithms access the received signal strength of the beacons in the ambit among other things, in particular as an indicator for the distance to the respective beacon.

The present invention is based on the basic invention to install beacons in light engineering/lighting technique. Therein, the advantage is in particular utilized that a light installation offers a permanent energy access to provide the beacon with energy. Therefrom, the advantage in turn arises that the battery of the beacon does not have to be exchanged and thus corresponding life cycle costs and processes, respectively, can be saved. Moreover, parameterizations of the beacon with higher energy consumption can also be adjusted without the lifetime of the beacon being reduced.

Installation processes of beacons and light engineering can additionally be unified. A further advantage is a defined locking position of a beacon transmitter, which is well protected from manipulation. Thus, a clear and secure identifier can be imparted to a site.

The following enumeration offers an overview of beacons in light engineering:
  using the energy supply of the light installation instead of a battery to reduce the life cycle costs of the beacon;
  using the energy supply of the light installation to adapt the transmitting parameters to the service and not to the available residual energy or the parameters of the battery (for example, frequent transmitting cycles generate high accuracy of the services, but also higher energy consumption);
  exchange of the battery of conventional beacons carries risks (e.g. with regard to errors in the handling);
  avoiding unavailability of the services by an uninterruptible energy supply of the beacon;
  installation site below the ceiling is ideal for the signal propagation of the beacon;
  installation site below the ceiling makes the overall system more robust against disturbances/shadings by objects at the level of the corridor level in contrast to an installation of the beacon itself at the level of the corridor level;
  beacon is protected from manipulation/foreign access (inadvertent/malicious);
  lighting and services (e.g. locating services) are offered as an overall system "from one source" (i.e. system provider is also service provider);
  possibility of using the secure communication network of the light installation, e.g. to configure the beacon or link beacons with each other;
  unification of the installation processes of beacons and light installation;
  possibility of coupling to further system elements of the peripheral building infrastructure via the communication network of the light installation, e.g. elements of the safety technology;
  optically attractive system since the beacon can be non-visibly accommodated in the light installation.

A beacon can be arranged in or at an electrical lighting device. The beacon communicates with a terminal (e.g. smart device). Therein, the beacon is optionally connected to further beacons or to infrastructure elements via a communication link.

Within an area, humans and apparatuses optionally have the challenge to orient themselves, to navigate and to find and use other local digital services (e.g. apps or app functions, Google Maps, Lightify light control). The light installation with integrated beacon in an area becomes a locating or orientation system for these potentials of use. With the self-location of the terminal realizable thereby, services can now be provided such as for instance navigation or the provision of site-specific information.

An aspect of the beacon technology is the possibility of configuration of typical parameters such as for example signal strength and transmitting interval of the beacon. Various scenarios of application can be individually supported by different configurations. If a high service quality (accurate locating in short distances) is requested (e.g. in indoor navigation), e.g. very short transmitting intervals are to be configured.

Currently, batteries are employed for the energy supply of the beacons. By the necessity to exchange these batteries in regular cycles, high effort as well as correspondingly high life cycle costs for the beacons arise.

A high service quality—for example high locating accuracy, large range, high transmitting interval—requires comparatively much energy at the transmitter module such that the battery of a battery-operated beacon has to be exchanged after short time (e.g. after one month). Each exchange of a battery additionally carries the risk that the functionality of the locating system is adversely affected by a small positional variation or false handling of the beacons besides the disadvantage of the exchange costs. Optionally, there is the risk that the operator (e.g. owner of a supermarket) is not aware of the energy deficiency of the beacons or does not find again the beacons if sufficient residual energy is not present anymore. However, the services (e.g. navigation) of the beacons should be permanently available to the user. This requires uninterruptible energy supply.

The attachment/installation of the beacons at/in or as part of a light installation/lamp or an illuminant (in the following briefly summarized: illuminant) would allow using the energy supply of the lighting device for the energy supply of the beacon and thus substituting the battery of the beacon and counteracting the problems (compare above) associated therewith with respect to a battery-operated beacon.

Basically, there is the specific problem that an operator and/or service provider does not obtain or obtains only insufficient information/feedbacks about the operation of the installed light installations or illuminants in some installation areas of light installations or illuminants. Examples hereto can be if the light installations or illuminants are not controlled via a so-called light management system or if a control is effected exclusively via presence detectors (e.g. in an underground garage) or if a light management system is employed, which does not obtain/obtains only few information from its connected light installations/lamps or illuminants.

Due to the lacking or insufficient information or operating data, it is for instance not possible to ascertain typical switching cycles of the application, e.g. to be able to give indications of energy saving potentials. Similarly, it cannot be possible to ascertain operating data of the applications, e.g. with regard to a required exchange of illuminants (operating hour counter).

Thus, the object of the present invention is in being able to more comfortably monitor the operation of lighting devices.

SUMMARY

According to the invention, this object is solved by a lighting device according to claim 1 as well as a method according to claim 13. Advantageous developments of the invention are apparent from the dependent claims.

Corresponding to the present invention, accordingly, a lighting device with an illuminant and a transmitting device is provided. The transmitting device is arranged in or at the illuminant and serves for wirelessly transmitting a locating signal (optionally with specific site, orientation and/or locating data) to a terminal external with respect to the lighting device. Thus, the lighting device can for example comprise a housing, in which the illuminant is arranged and in or at which the transmitting device is located. The transmitting device primarily serves to transmit a locating signal to an external (mobile) terminal. This locating signal can for example be a fixed preset signal and the terminal acquires the receiving strength to orient itself at the illuminant. In another variant, the locating signal can comprise locating data geometrically representing the site of the illuminant such that the terminal can estimate its own site via it. According to still another variant, the locating signal for example includes identification data of the illuminant such that the terminal can exactly identify that illuminant, in the vicinity of which it is located. The terminal can then locate itself by this information and corresponding map material.

Moreover, the lighting device according to the invention comprises a data processing device, which is arranged in or at the illuminant, for extracting illuminant data about the illuminant and for providing this data for the transmitting device. This illuminant data is for example switching times, at which the illuminant was switched on and off, respectively, or operating hours. However, the illuminant data can moreover also be serviceability signals or other data relating to the illuminant. The extracted illuminant data is then provided by the data processing device for transmitting to the external terminal by the transmitting device. Thereby, the lighting device is used not only for transmitting locating data and locating signals, respectively, but also for transmitting illuminant data and operating data of the illuminant, respectively, to be able to better monitor it.

Preferably, the illuminant and the transmitting device comprise an energy supply device for common, in particular parallel energy supply. Thereby, the transmitting device does not require an own energy supply. Rather, it can for example also be supplied with energy from a ballast of the lighting device, which supplies the illuminant. Therein, the transmitting device is preferably supplied with energy parallel to the illuminant. Thus, a LED module and a transmitting device can for example comprise supply inputs connected in parallel.

Moreover, the energy supply device can comprise an energy buffer exclusively for supply of the transmitting device. Thus, a battery or an accumulator can for example be provided, which supplies the transmitting device with energy even if the illuminant is not supplied with energy and is for example switched off. In this manner, it can be ensured that the transmitting device can transmit the locating signal and optionally the illuminant data independently of the operation of the illuminant.

In a special configuration, it can be provided that the transmitting device is formed as a beacon. Such a beacon is a standard apparatus, by which site-specific information preferably for locating or orienting can be emitted. This beacon can then also be employed for emitting the illuminant data.

In a development, the transmitting device is formed as a wireless communication device, by which data for the data processing device can also be received. This means that the transmitting device has not only transmitting functionality, but also receiving functionality and thus is suitable for bidirectional communication. In this manner, configuration data for the illuminant or the transmitting device can for example be (wirelessly) loaded into the lighting device.

In an advantageous configuration, the lighting device comprises an energy acquisition device for acquiring an energy supply of the transmitting device, wherein the illuminant data contains information from the energy acquisition device to the effect whether or not the transmitting device is supplied with energy from the energy buffer at a preset point of time. Such information if the transmitting device is supplied with energy from a supply device of the illuminant or from the energy buffer (e.g. battery) gives indication if the energy supply correctly functions for example if it is known that the illuminant is illuminated. Namely, the illuminant or the supply thereof would also have to supply the transmitting device and not for instance the energy buffer in this case.

Optionally, the lighting device also comprises a state of charge acquisition device for acquiring a state of charge of the energy buffer, wherein the illuminant data contains information from the state of charge acquisition device about a current state of charge of the energy buffer. Such information about the state of charge is for example of importance if it has to be decided on the serviceability or the residual lifetime of an energy buffer. The state of charge can also offer information to the effect how long the transmitting device can still be operated without the illuminant having to be switched on.

Furthermore, the lighting device can comprise an error acquisition device for acquiring an error relating to the illuminant, wherein the illuminant data contains an error code of the error acquisition device. Such an error acquisition device represents a comfortable diagnostic tool, by which an error can be recognized in targeted manner. In particular, the type of an error can thus be faster acquired without expensive data transfers being required.

Corresponding to another implementation variant, the lighting device comprises a sensor device for acquiring a quantity from an environment or from the lighting device, wherein the illuminant data contains corresponding environmental data of the sensor device. Thus, the environmental data can for example include a temperature in the environment of the illuminant or a temperature of the illuminant. However, the acquired quantity can moreover also relate for example to air humidity, atmospheric pressure, a current consumption, an electrical voltage or the like.

Together with at least one lighting device as described above and the terminal, a lighting system can be formed, wherein the terminal can comprise a separate communication interface to a data processing device different from the lighting device. Thereby, operating data of the illuminant can for example be recorded on a central data acquisition device e.g. in the Internet or on a separate sever via the terminal.

According to a further embodiment, the lighting system is equipped with multiple such lighting devices, wherein the transmitting device of each lighting device is formed as a communication device with transmitting and receiving function, and a meshed network is established between the communication devices of the lighting devices. The illuminant data and operating data, respectively, of the illuminants can thus be exchanged among each other and further processed at suitable points of the network.

According to the invention, the above object is also solved by a method for operating a lighting device comprising an illuminant, a transmitting device arranged in or at the illuminant by wirelessly transmitting a locating signal from the transmitting device to a terminal external with respect to the lighting device. Subsequently, extraction of illuminant data about the illuminant and transmitting the illuminant data besides the locating data from the transmitting device to the external terminal are effected. The above described functional features of the lighting device according to the invention and the lighting system according to the invention, respectively, can also be used for development of the method according to the invention. Therein, they are to be understood as corresponding method features.

BRIEF DESCRIPTION OF THE DRAWINGS

Now, the present invention is explained in more detail based on the attached drawings, in which there show.

DESCRIPTION OF THE PREFERRED EMBODIMENTS

Figure 1:
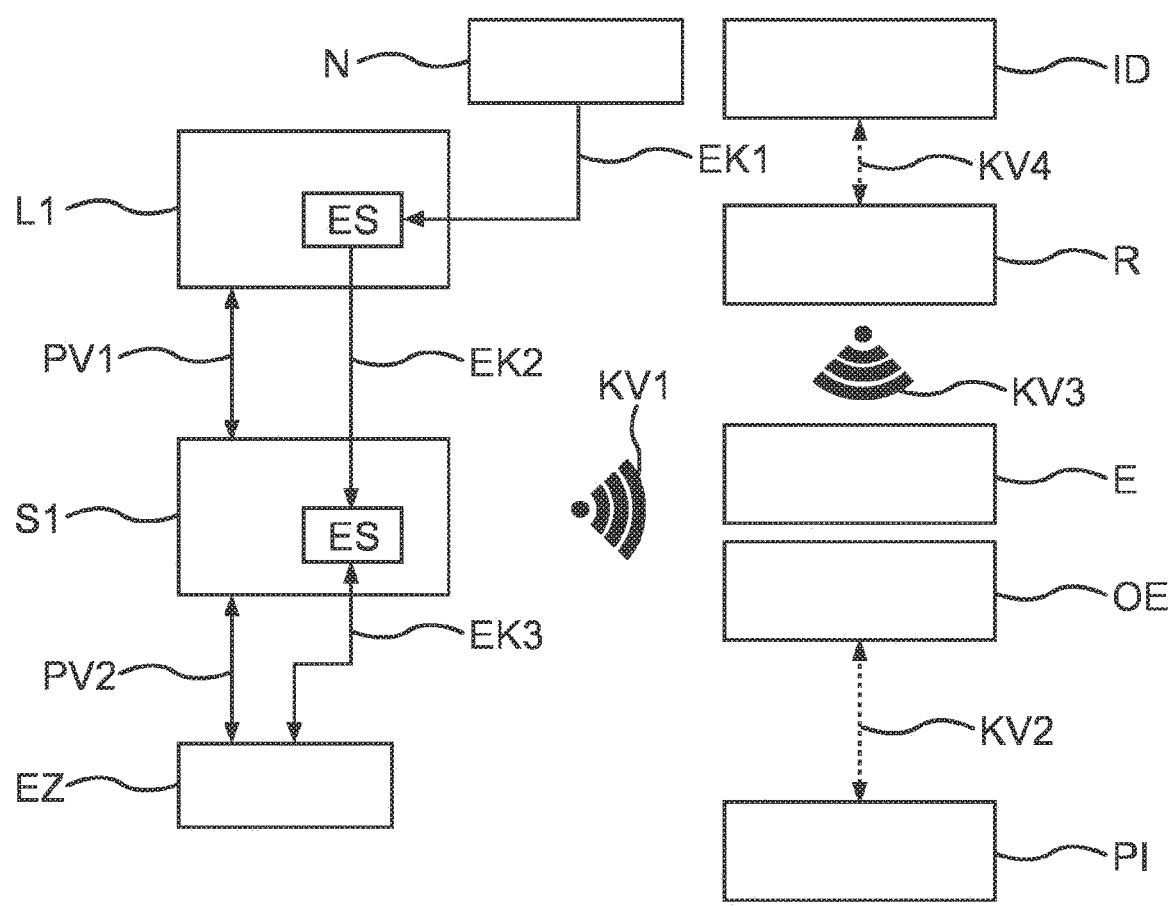
FIG. 1 a schematic diagram to the construction of a lighting device with transmitting-receiving device and peripheral apparatuses.

The embodiments described in more detail below present preferred embodiments of the present invention. Therein, it is to be noted that the individual features can be realized not only in the described feature combinations, but also alone or in other technically reasonable feature combinations.

An exemplary lighting device can be installed in a building, a plant or else for example in a ship, where it is required to also provide respectively site-specific information besides the lighting. Such a lighting device comprises a transmitting or communication device (e.g. beacon) in/at or as part of a light installation/lamp or an illuminant (below summarized as illuminant). The communication or transmitting device is preferably supplied with energy via the illuminant or the current supply device thereof (e.g. electronic ballast). A possibility, in which an expensive energy converter is not required, is the electrical connection of the communication device parallel to the illuminant, namely for example a LED unit or a group of LEDs or possibly a LED support module.

Moreover, it is advantageous if the lighting device comprises an energy buffer (e.g. accumulator, capacitor). It provides the required energy in the operation to the transmitting or communication device, e.g. beacon, if the energy supply by the illuminant is interrupted (e.g. in case that the lamp is switched off and does not emit light).

As was initially mentioned, especially in larger systems with multiple lighting devices, there is the problem not to readily know or be able to readily find out the operating state of each lighting device. In order to counteract this problem, a lighting device and a method are proposed, respectively, which transfer further information relating to the light installation and/or the illuminant and/or the system via the transferred communication data within the scope of a communication link between a transmitting (receiving) device (e.g. beacon) in/at or as part of a light installation/lamp or an illuminant and a stationary and/or non-stationary terminal. In this manner, additional further information (e.g. advertizing data of a beacon module) is transferred via the transmitted data (also called illuminant data below) of the transmitting (receiving) device (below briefly: transmitting device), which extends beyond a cyclically emitted identification of the transmitting device and in particular relates to the light installation or the illuminant or the system.

Typical information or illuminant data to be transferred can relate to the operating state. In a first state of the lighting system or the lighting device, energy supply of the transmitting device is effected via the illuminant or the energy supply device thereof. In a second operating state, the energy supply is effected via an energy buffer or a battery. In an example, an input voltage of 3 V is applied to the lighting device. This corresponds to a supply via the illuminant, while an input voltage of 2.8 V corresponds to a supply by the battery or the accumulator. Such a differentiation substantially allows conclusion about the operating states, in which the light installation was switched on ("light on") and in which the light installation or the illuminant was switched off ("light off").

Further typical information to be communicated can relate to the state of charge of the energy buffer of the system or error codes of the light installation or the illuminant. Optionally further data is conceivable for transfer, which is acquired by the light installation/lamp or the illuminant, e.g. temperatures within/outside of the light installation/lamp or the illuminant.

In the following, five different, possible specifications for an overall system/lighting system with at least one lighting device are presented. These specifications are purely exemplary and can be further varied.

According to a first variant, which is illustrated in FIG. 1, a lamp/light installation or illuminant (below briefly illuminant) L1 is in physical connection PV1 to a transmitting (receiving) device (below briefly transmitting device) S1. This means that the transmitting device S1 is arranged in/at the lighting device L1 or part of it. Here, the illuminant L1 comprises an integrated energy interface ES, which can be realized by a ballast. This energy interface ES of the illuminant L1 obtains energy from a supply network N via an energy transfer channel EK1. The supply network N can for example provide an AC voltage of 230 V.

The transmitting device S1 also comprises an energy interface ES. Moreover, it comprises an information processing unit IV.

The energy interface ES of the transmitting device S1 obtains energy from the energy interface ES of the illuminant L1 via an energy transfer channel EK2 if the illuminant L1 is switched on.

In the example of FIG. 1, an energy buffer EZ is connected to the transmitting device S1 for uninterruptible current supply, which can for example be designed as an accumulator or capacitor. The energy buffer EZ is arranged in or at the transmitting device S1 according to the physical connection PV2 or is part of it. The energy buffer EZ is coupled to the energy interface ES of the transmitting device S1 via a bidirectional energy transfer channel EK3. If the illuminant L1 is switched on, the energy buffer EZ can be charged via the transmitting device S1 or the energy interface ES thereof. However, if the illuminant L1 is switched off, the energy supply of the transmitting device S1 can be effected via the energy buffer.

The transmitting device S1 transfers a locating signal, which for example contains site data or orientation data, to a mobile terminal E or also to multiple such terminals by means of a wireless communication link KV1 (e.g. BLE link). Moreover, the transmitting device S1 transfers further information or operating state data relating to the illuminant L1 in addition to the locating signal via the communication link KV1. In particular, this further information or operating state data relating to the illuminant L1 is also wirelessly transferred to a stationary terminal OE via the communication link KV1. This stationary or place-bound terminal OE can be supplied via an energy buffer and/or via an external energy supply. The stationary terminal OE additionally comprises at least one further wireless or wired communication interface for a communication link KV2 with a peripheral infrastructure PI besides the communication interface for wireless communication via the communication link KV1. It can for example be a service server, a Cloud etc. In addition, the stationary terminal OE can optionally comprise an internal data storage, on which the transmitted data (for example operating information of the illuminant L1) is stored. The stored data could for example be read out via a wired interface.

Furthermore, there is for example a wireless communication link KV3 from the mobile terminal E to a router R. This wireless communication link KV3 can for example be a WiFi link. The router R in turn is in communication link KV4 with an infrastructure for services ID. It can for example be the Internet or a central service server.

During the operation, the energy transfer channel EK3 between the transmitting device S1 and the energy buffer EZ can for example be monitored. For example, if energy flows from the energy interface ES of the transmitting device S1 into the energy buffer EZ in a first state, thus, external energy supply is effected by the illuminant L1 and the light is on. In contrast, energy flows from the energy buffer EZ to the energy interface ES of the transmitting device S1 in a second state. This means that external energy supply by the illuminant L1 is not present and the light is switched off. Corresponding illuminant data representing the two states can be communicated from the transmitting device S1 via the communication link KV1 to the mobile terminal E or the stationary terminal OE besides the locating signal.

Figure 2:
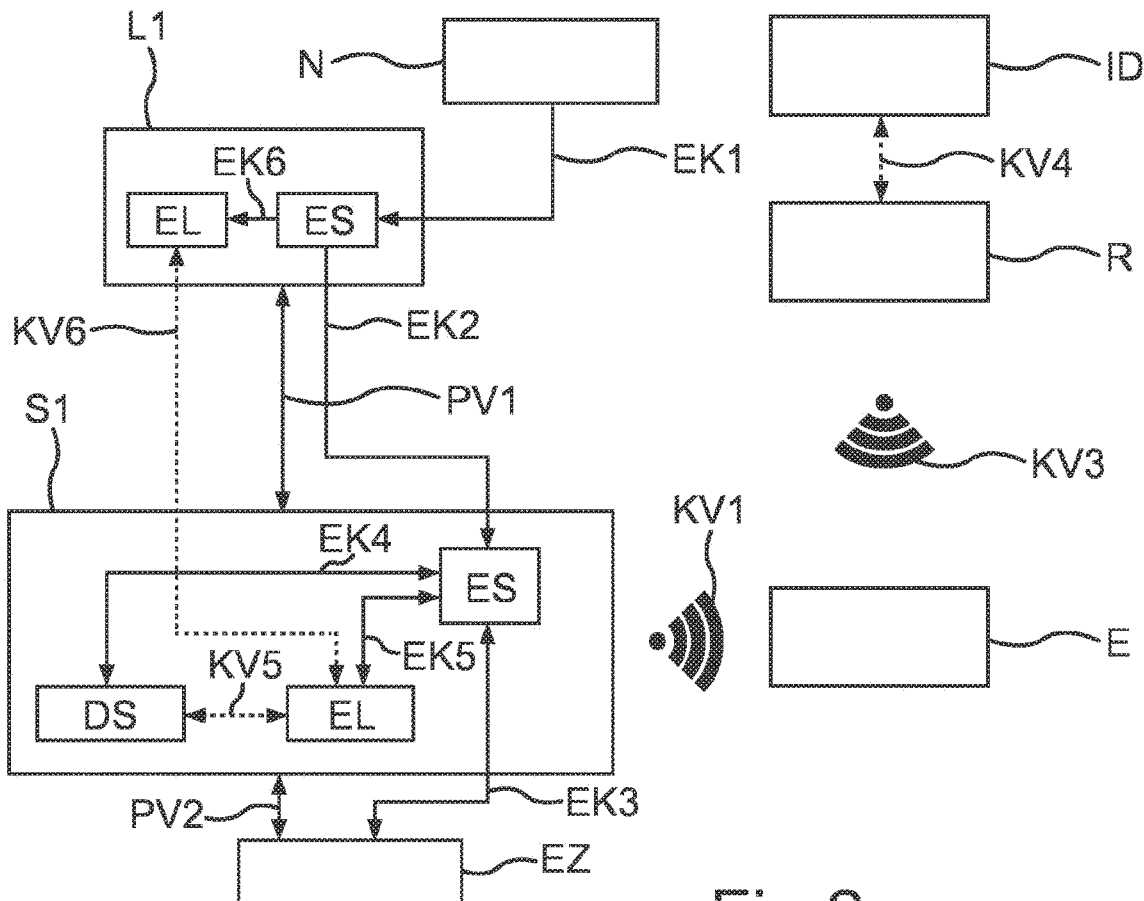
FIG. 2 a schematic diagram to the construction of an alternative embodiment with a data storage of the transmitting-receiving device.

A second variant of the lighting system is schematically reproduced in FIG. 2. Those components, which are also found in the example of FIG. 1, are described in detail there. Deviating from the example of FIG. 1, the transmitting device S1 explicitly comprises a data storage DS in the example of FIG. 2. This data storage DS is in or at the transmitting device S1, i.e. in or at a housing of the transmitting device S1. It is supplied with energy from the energy interface ES of the transmitting device S1 via an energy transfer channel EK4. In addition, the transmitting device S1 comprises an information processing unit or electronics EL, which is also supplied with energy from the energy interface ES of the transmitting device S1 via an energy transfer channel EK5. The data storage DS is in communication link KV5 with the electronic unit EL. Data can be bidirectionally transferred via this communication link KV5. Moreover, the illuminant L1 also comprises an electronic unit EL. It is supplied with energy from the energy interface ES of the illuminant L1 via an energy transfer channel EK6. The electronic unit EL of the illuminant L1 is in communication link KV6 with the electronic unit EL of the transmitting device S1.

Operating data, i.e. illuminant data, of the illuminant L1 can be temporarily stored on the data storage. Upon requests, for example by the terminal E (e.g. smart device) to the transmitting device S1, the illuminant data is communicated to the terminal E via the wireless communication interface KV1 (e.g. BLE link). If a communication link KV6 moreover exists between the illuminant (e.g. on the electronic ballast) and the transmitting device S1, error codes of the light installation or of the illuminant L1 can for example also be communicated to the terminal E via this link.

According to a third variant, an internal data storage is provided in/at or as part of the illuminant L1. The operating data of the illuminant, i.e. the illuminant data, is preferably temporarily stored on this data storage. Upon requests for example by the terminal E (e.g. smart device) to the transmitting device S1, the information is communicated to the terminal E via the wireless communication interface KV1. Prerequisite is a communication link between the data storage integrated in the illuminant L1 (e.g. on the electronic ballast) and the transmitting device S1.

Figure 3:
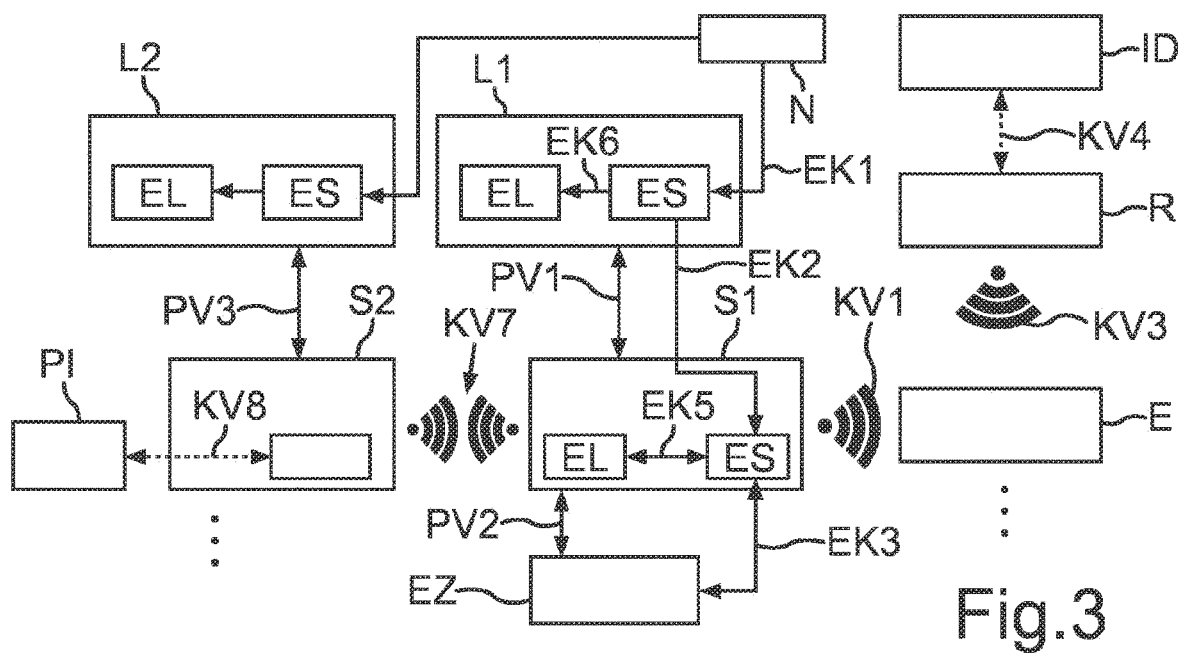
FIG. 3 a schematic diagram to the construction of a further embodiment with multiple lighting devices and linked transmitting-receiving devices.

A fourth variant of a lighting system according to the invention is schematically illustrated in FIG. 3. Those components from the preceding embodiments, which are also provided in this example, are not described in more detail below. In this respect, reference is made to the description of FIGS. 1 and 2.

In the system of FIG. 3, at least one second illuminant L2 is provided besides the first illuminant L1. This second illuminant L2 also comprises an electronic unit EL and an energy interface ES. The electronic unit EL is supplied with energy from the energy interface ES via an energy transfer channel EK7, which in turn obtains energy from the supply network N via an energy transfer channel EK7. Similarly, a second transmitting device S2 is associated with the second illuminant L2 via a physical connection PV3. This means that the transmitting device S2 is in or at the second illuminant L2 or is part thereof.

The energy supply of the second transmitting device S2, which in turn can also have receiving functionality and be realized as a beacon, is not illustrated in more detail in FIG. 3 for the sake of clarity. However, it can be realized as in the case of the first transmitting device S1.

A communication link KV7 is established between the first transmitting device S1 and the second transmitting device S2. It is preferably a wireless communication link, e.g. a BLE link.

Multiple such transmitting devices S1, S2 etc. with pairwise communication link can be provided in the lighting system. Thereby, a so-called meshed network can be realized between the transmitting devices. Locating and operating data can thus be exchanged between the illuminants and their transmitting devices, respectively.

At least one subscriber of the network (the transmitting device S2 associated with the second illuminant L2 in the example of FIG. 3) comprises at least one additional wireless or wired communication interface KS to a peripheral infrastructure (e.g. service server, Cloud) via a communication link KV8. Thereby, the operating data of the multiple illuminants can be picked up not only by the terminal E, but optionally also by the peripheral infrastructure PI.

Corresponding to a fifth variant, a combination of the first variant and the fourth variant can be provided. Therein, a meshed network is established between multiple transmitting devices, wherein the information relating to the illuminants is communicated. A stationary terminal is additionally provided in at least one position of the service area, to which the relevant data is communicated by a transmitting device in the immediate environment. The terminal E is formed corresponding to the first variant.

Multiple objects can be realized by the above variants. Thus, typical switching cycles of the application or the illuminants or the lighting system can for example be ascertained to for example be able to give indications of energy saving potentials. However, operating times of the application/the light installation for example with regard to a required exchange of illuminants (operating hour counter) can moreover also be ascertained. In addition, an identification of areas can be allowed by the above described lighting systems, in which the light is often switched off. Finally, recording of data can also be effected to be able to prove a possible misuse in warranty cases. In particularly advantageous manner, further data (illuminant data) can hereto for example be transferred from the ballast (error codes etc.), e.g. within the scope of a readout process, via an intelligent interface to the electronic ballast (ECG) of the light installation/the lamp or the illuminant.

The invention claimed is:
1. A lighting device comprising:
   an illuminant;
   a transmitting device arranged in or at the illuminant for wirelessly transmitting a locating signal to a terminal external with respect to the lighting device;
   a data processing device arranged in or at the illuminant for extracting illuminant data about the illuminant and for providing this data for the transmitting device;
   an energy supply device for common energy supply; wherein the energy supply device comprises an energy buffer exclusively configured to supply the transmitting device;
   an energy acquisition device configured to acquire an energy supply of the transmitting device, wherein the illuminant data comprises information from the energy acquisition device as to whether the transmitting device is supplied with energy from the energy buffer at a preset point of time; and
   wherein the transmitting device is formed to also transmit the illuminant data to the external terminal besides the locating signal.

2. The lighting device according to claim 1, wherein the transmitting device is formed as a beacon.

3. The lighting device according to claim 1, wherein the transmitting device is formed as a wireless communication device, by which data for the data processing device can also be received.

4. The lighting device according to claim 1, further comprising a time acquisition device, wherein the illuminant data contains information from the time acquisition device to the effect of when the illuminant was switched on and/or switched off.

5. The lighting device according to claim 1, further comprising a state of charge acquisition device for acquiring a state of charge of the energy buffer, wherein the illuminant data contains information from the state of charge acquisition device about a current state of charge of the energy buffer.

6. The lighting device according to claim 1, further comprising an error acquisition device for acquiring an error relating to the illuminant, wherein the illuminant data contains an error code of the error acquisition device.

7. The lighting device according to claim 1, further comprising a sensor device for acquiring a quantity from an environment or from the lighting device, wherein the illuminant data contains corresponding environmental data of the sensor device.

8. A lighting system comprising:
   at least one lighting device according to claim 1, and
   a terminal external with respect to the at least one lighting device,
   wherein the terminal comprises a separate communication interface to a data processing device different from the at least one lighting device.

9. The lighting system according to claim 8 further comprising:
   a plurality of lighting devices according to claim 1, wherein the transmitting device of each lighting device is formed as a communication device with a transmitting and a receiving function, and a meshed network is established between the communication devices of the lighting devices.

10. A method for operating a lighting device with an illuminant and a transmitting device arranged in or at the illuminant, the method comprising:
    wirelessly transmitting a locating signal from the transmitting device to a terminal external with respect to the lighting device;
    extracting illuminant data about the illuminant;

transmitting the illuminant data from the transmitting device to the external terminal in addition to the locating signal; and acquiring an energy supply of the transmitting device, wherein the illuminant data contains information as to whether the transmitting device is supplied with energy from an energy buffer at a preset point of time.

11. A lighting device comprising:

an illuminant;

a transmitting device arranged in or at the illuminant for wirelessly transmitting a locating signal to a terminal external with respect to the lighting device;

a data processing device arranged in or at the illuminant for extracting illuminant data about the illuminant and for providing this data for the transmitting device;

an energy supply device for common energy supply; wherein the energy supply device comprises an energy buffer exclusively for supplying the transmitting device;

a state of charge acquisition device for acquiring a state of charge of the energy buffer;

wherein the illuminant data comprises information from the state of charge acquisition device about a current state of charge of the energy buffer;

wherein the transmitting device is formed to also transmit the illuminant data to the external terminal besides the locating signal.

* * * * *